United States Patent [19]
Butterfield

[11] Patent Number: 5,689,371
[45] Date of Patent: Nov. 18, 1997

[54] FILTER ASSEMBLY

[75] Inventor: William F. Butterfield, Winchester, Mass.

[73] Assignee: Polaroid Corporation, Cambridge, Mass.

[21] Appl. No.: 521,345

[22] Filed: Aug. 30, 1995

[51] Int. Cl.⁶ .............................. G02B 27/00; G02B 7/02
[52] U.S. Cl. ..................... 359/609; 359/601; 359/809; 359/811
[58] Field of Search ............... 359/601, 608–611, 359/809, 811, 819; 348/832–843; 40/782–800

[56] References Cited

U.S. PATENT DOCUMENTS

| | | | |
|---|---|---|---|
| 4,051,535 | 9/1977 | Inglis | 359/809 |
| 4,427,264 | 1/1984 | Kamerling | 348/842 |
| 4,529,268 | 7/1985 | Brown | 359/601 |
| 4,686,576 | 8/1987 | Dickie et al. | 348/832 |
| 4,712,870 | 12/1987 | Robinson et al. | 359/811 |
| 4,778,252 | 10/1988 | Filho | 359/819 |
| 4,788,597 | 11/1988 | Gart et al. | 348/832 |
| 4,802,294 | 2/1989 | Baus | 40/782 |
| 5,004,320 | 4/1991 | Nagai et al. | 348/834 |
| 5,048,928 | 9/1991 | Davis | 359/601 |
| 5,155,627 | 10/1992 | Keehn et al. | 359/609 |
| 5,202,768 | 4/1993 | Oboza et al. | 348/836 |
| 5,227,916 | 7/1993 | Theirl et al. | 359/609 |

OTHER PUBLICATIONS

Brochure by 3M Safety and Security Systems Division, 3M Center Building, St. Paul, MN 55144, "3M Computer Filters," 1994.

Brochure by OCLI, Optical Coating Laboratory, Inc., 2789 Northpoint Parkway, Santa Rosa, CA, "Glare/Maximum Plus Guard," (Both sheets are relevant.), Nov. 1994.

Brochure by ACCO USA, Inc., 770 S. ACCO Plaza, Wheeling IL, "Anti-Glare Screen Filters," (Document is relevant), Jun. 1994.

Brochure by ACCO USA, Inc., 770 S. ACCO Plaza, Wheeling IL, "CAD/CAM and Security Screen Filters," (Both sides of sheet are relevant), Jun. 1993.

Brochure by 3M Commercial Office Supply Division, 3M Center Building, St. Paul, MN "3M Innovation," (All four sheets are relevant), 1995.

*Primary Examiner*—Thong Nguyen
*Attorney, Agent, or Firm*—Leslie Payne

[57] ABSTRACT

An optical filter assembly for use on a visual display device is disclosed. Included in the assembly is a frame defining a viewing aperture which frame is mounted on a visual display device such that the aperture is in registry with the screen of the visual display device. An optical filter is provided for covering the aperture. The frame assembly includes a plurality of side walls which extend the distance sufficient for reducing the passage of room light to behind the optical filter. The frame assembly also includes structure for holding releasably the optical filter to the frame assembly and structure associated with the frame assembly for spacing the optical filter from the display screen. Included is spacing structure which includes a protrusion intrical with the frame for contacting the display screen for thereby physically spacing the filter from the display screen.

4 Claims, 4 Drawing Sheets

1

FILTER ASSEMBLY

BACKGROUND OF THE INVENTION

The present invention relates generally to optical filter assemblies for visual display devices. In particular, it relates to an optical filter assembly for removably receiving and securing an optical filter in a convenient and safe manner so that it is easily mountable in operative relationship with a computer monitor.

Because of the substantial growth of computers on a worldwide basis, an increasingly large segment of the population, whether for business, academic, or recreation purposes is sitting in front of visual display devices, such as computer monitors, for significant portions of the day. A vast majority of the computer monitors are a source of glare and, as a result thereof, can lead to operator eyestrain problems. A number of optical filters have been proposed to minimize such glare. In addition, some of the filters are able to reduce certain kinds of electric field radiation which emanates from the monitors. Some of the known filters comprise a translucent screen or panel mountable on the computer's monitor in a variety of ways so that the screens are positioned in from of the monitor's display area. Not only are consumers purchasing the filters for their anti-glare and electric radiation reduction purposes, but they also require that the products look like a part of their monitor for aesthetic reasons. In this latter regard, some filters are attached to a mounting frame which holds the filter in registry with the monitor's display area. Exemplary ones of such filters and associated mounting mechanisms therefor are described in U.S. Pat. Nos.: 4,427,264; 5,155,627; and 5,227,916. Many of the known mounting arrangements and filters are unitized and therefore their versatility is compromised since if there is damage to the filter and/or frame, the entire unit must be replaced. In addition, of course, these kinds of frames are not retrofittable for accepting filters which are already in use. While there are mounting assemblies with filter panels which are removable, such as described in U.S. Pat. Nos. 4,788,597 and frames which retrofittably accept filter panels, such as described in U.S. Pat. No. 4,529,268, there is nevertheless a continuing desire to improve upon their overall performance. This is so especially in terms of facilitating a rapid and reliable replacement or retrofitting of optical filters, in a manner which avoids damage to the filters during replacement or use.

SUMMARY OF THE INVENTION

In accordance with the present invention, there is provided an improved optical frame assembly for removable connection to a visual display device; such as a computer monitor. In one embodiment, there is provided an optical filter assembly which comprises a generally polygonal-shaped frame assembly defining a viewing aperture therethrough. The frame assembly is mountable on a visual display device, such that the viewing aperture is in registry with a visual display area of the visual display device. Provision is made for an optical filter that is sized for covering the aperture and thereby the visual display area. The frame assembly includes means for releasably holding an optical filter thereto. Included in the invention is means located on the frame for effecting a spacing of the filter from the display device so as to avoid abrasion damage to the optical filter. The frame includes means for centering the optical filter with respect to the aperture while the latter is being mounted onto the frame.

In an illustrated embodiment, the frame includes a plurality of extended side walls which extend a distance sufficient from the plane of the viewing aperture for encompassing the visual display device so as to effect a light baffling arrangement with respect thereto and thereby minimize room light glare.

In an illustrated embodiment, the spacing means engages the monitor's screen and thus spaces the filter therefrom for thereby avoiding abrasion damage to the filter.

In another illustrated embodiment, the frame assembly defines a filter centering means for facilitating the centering of the filter, in a desired position relative to the viewing aperture, during insertion of the filter on the frame.

Among the objects of the invention are an improved optical filter assembly for use in combination with visual display devices which enables the filter of the assembly to be removed and which allows the frame to retrofit existing filters. In addition the optical filter assembly removably receives and secures an optical filter in a convenient and safe manner so that it is easily mountable in operative relationship with a computer monitor.

Other objects and further scope of applicability of the present invention will become apparent when reading the following detailed description thereof when taken in conjunction with the accompanying drawings wherein like parts are represented by like reference numerals throughout the several views.

DETAILED DESCRIPTION

Figure 1:
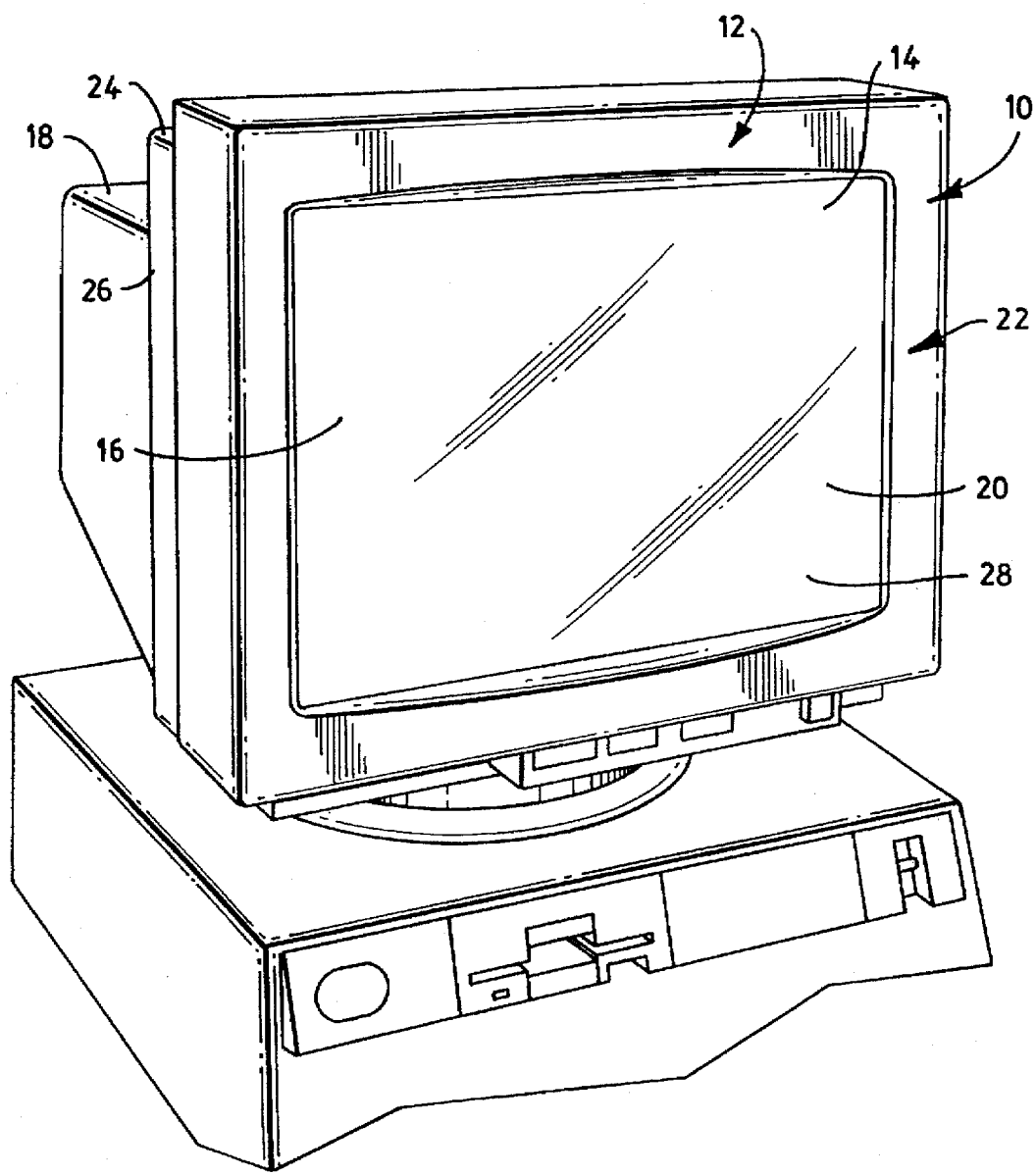
FIG. 1 is a perspective view of an optical frame assembly in mounted relationship to a computer monitor.

Reference is made to FIGS. 1-4 of the drawings for illustrating one preferred embodiment of an optical filter assembly 10. In essence, the optical filter assembly 10 includes a contoured mounting frame assembly 12 and an optical filter panel 14 which is removably attached thereto. The optical filter assembly 10 is adapted to be easily fit over the front of a display screen 16 of a computer monitor 18 so that the filter panel is in registry with a visual display area 20 of the screen as well as for providing a custom wrap of the frame assembly around the monitor.

The computer monitor 18 includes a generally rectangular housing 22 having a top wall 24 and a pair of side walls 26 which encompasses the visual display screen 16 that is made of glass. The mounting frame assembly 12 has, in this embodiment, a generally rectangular configuration and is sized to generally match the size of the rectangular housing 22. The mounting frame assembly 12 defines a central viewing aperture 28 which is constructed and sized to be in registry with the display area of the screen 16 for effectively filtering the latter. The mounting frame assembly can be made of an integral one-piece member made of a suitable plastic material, such as ABS, and includes a top wall 30 and a pair of side walls 32 and a bottom wall 33. However, there is no bottom wall and this facilitates a user slipping the mounting frame assembly over the monitor so as to be in front of the display screen 16. In this embodiment, the top and side walls 30, 32 of the frame are, when mounted, spaced relatively closely to the exterior side walls of the monitor and, in addition, extend away from the plane of the aperture 28 by an extended distance which has been determined to minimize the ability of room light to get behind the frame assembly 12 and the filter panel 14 to thereby add undesirable light emanating from the filter panel. This structuring of the frame assembly is advantageous since it eliminates the need for any additional light baffling or sealing material forming a part of the frame assembly.

Figure 2:
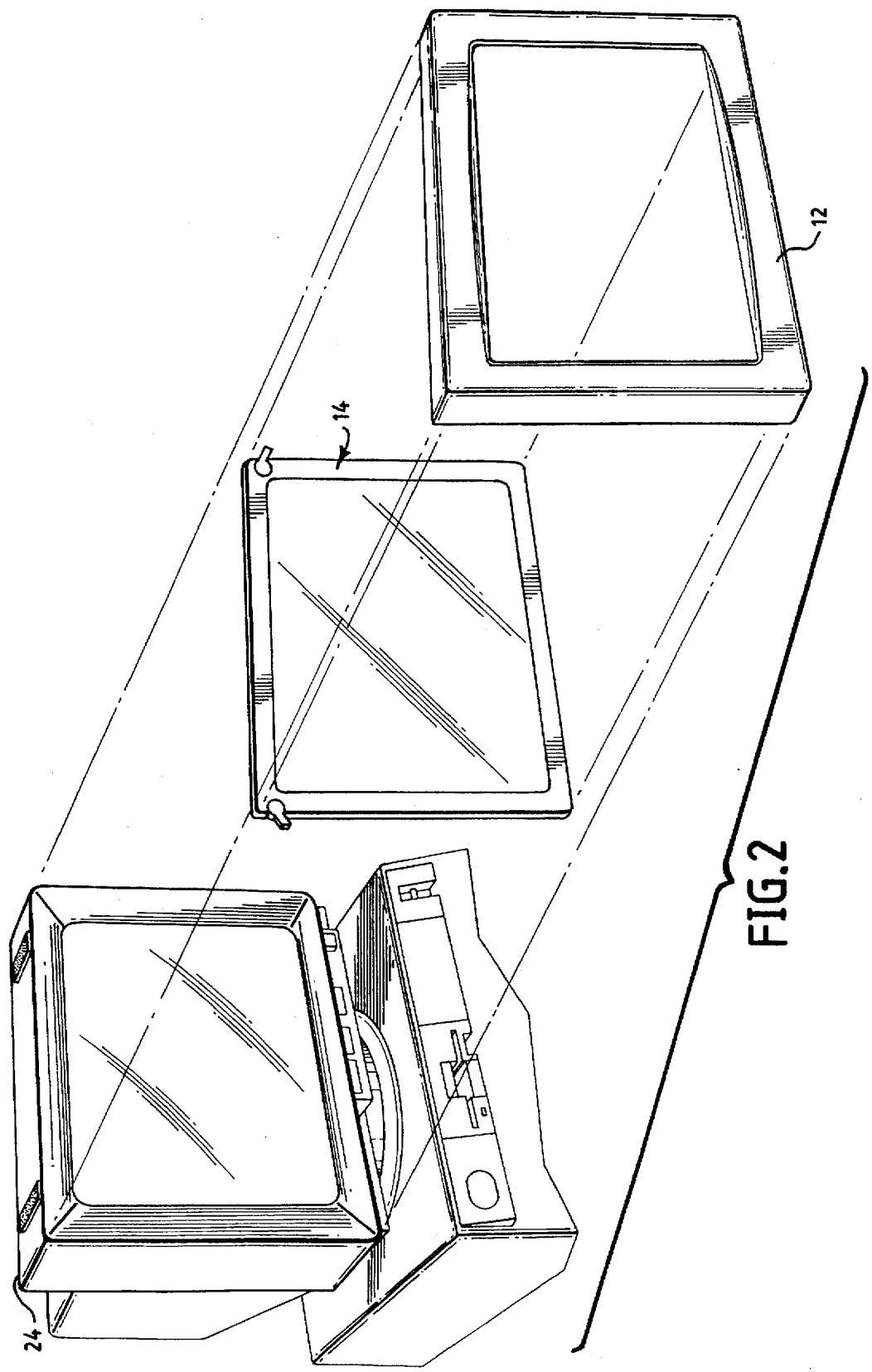
FIG. 2 is an exploded perspective view of the optical frame assembly in relationship to the monitor.
Figure 4:
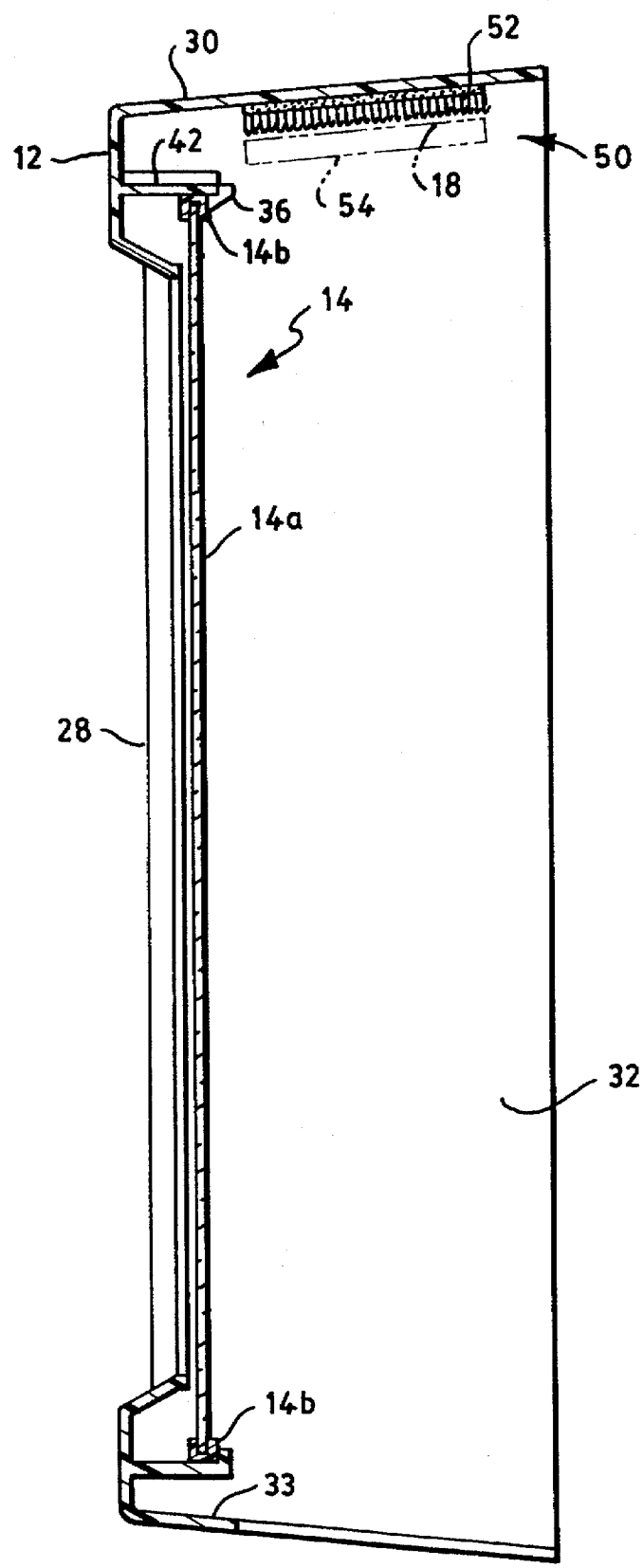
FIG. 4 is side cross-sectional view of the mounting frame.

As is illustrated in FIGS. 1 and 2, the front of the mounting frame assembly 14 has a stylized configuration which is similar to that of a typical monitor housing so as to thereby provide an aesthetic appearance for the optical filter assembly. As seen in FIG. 4, the rearward or computer-facing side 34 of the mounting frame assembly 12 is relatively enlarged for retrofitting already existing optical filters; such as Polaroid's CP-Filters and which are commercially available from Polaroid Corporation, Cambridge, Mass. In this embodiment, the optical filter panel 14 need not be constructed as those types which already commercially available, but can be constructed in a manner wherein they do not have pivotal mounting arms. The optical filter panel 14 can have a filter 14a with a generally rectangular configuration which is surrounded by a border 14b made of plastic, The filter 14a is preferred to possess circular polarizer filter capabilities. Circular polarizing filters are extremely beneficial in suppressing virtually all of the reflected light and enhance contrast enhancement. In addition, the filter 14a has multi-layer optical coatings. The coatings on the filter can eliminate static and reduce significantly VLF/ELF electric field radiation. It will be appreciated, however, that the above described filter is but one of many types which can be used consistent with the spirit and scope of the present invention; which is not limited to use with the above noted filters.

For releasably holding the filter panel 14, there is provided a pair of rearwardly extending and snap-fitting latching fingers 36 protruding from the rearward side at opposite ends of the top of the viewing aperture 28. Protruding from beneath the aperture 28 is a holding ledge 38 which extends along the length of the aperture and is provided with upstanding tabs 40 adjacent the ends thereof. The filter holding ledge 38 and the tabs 40 are for receiving and holding the bottom of the optical filter panel 14 whenever the latter is attached to the frame assembly. Integrally extending between the latching fingers 36 is thin and elongated ridge 42. The ridge 42 extends a distance from the surface of the rearward side 34 so that it will engage the monitor. In addition, the holding ledge 38 is similarly constructed so as to engage the monitor's housing or glass screen. The advantage of having the ledge and ridge contact the monitor is that they space the optical filter panel 14 from the hard glass surface of the display screen. This is significant in that it minimizes significantly or even eliminates any damage, such as abrasion being done to the optical filter panel 14. Although the present invention prefers a filter spacing arrangement, as described above, it envisions that a plurality of other approaches can be employed.

Figure 3:
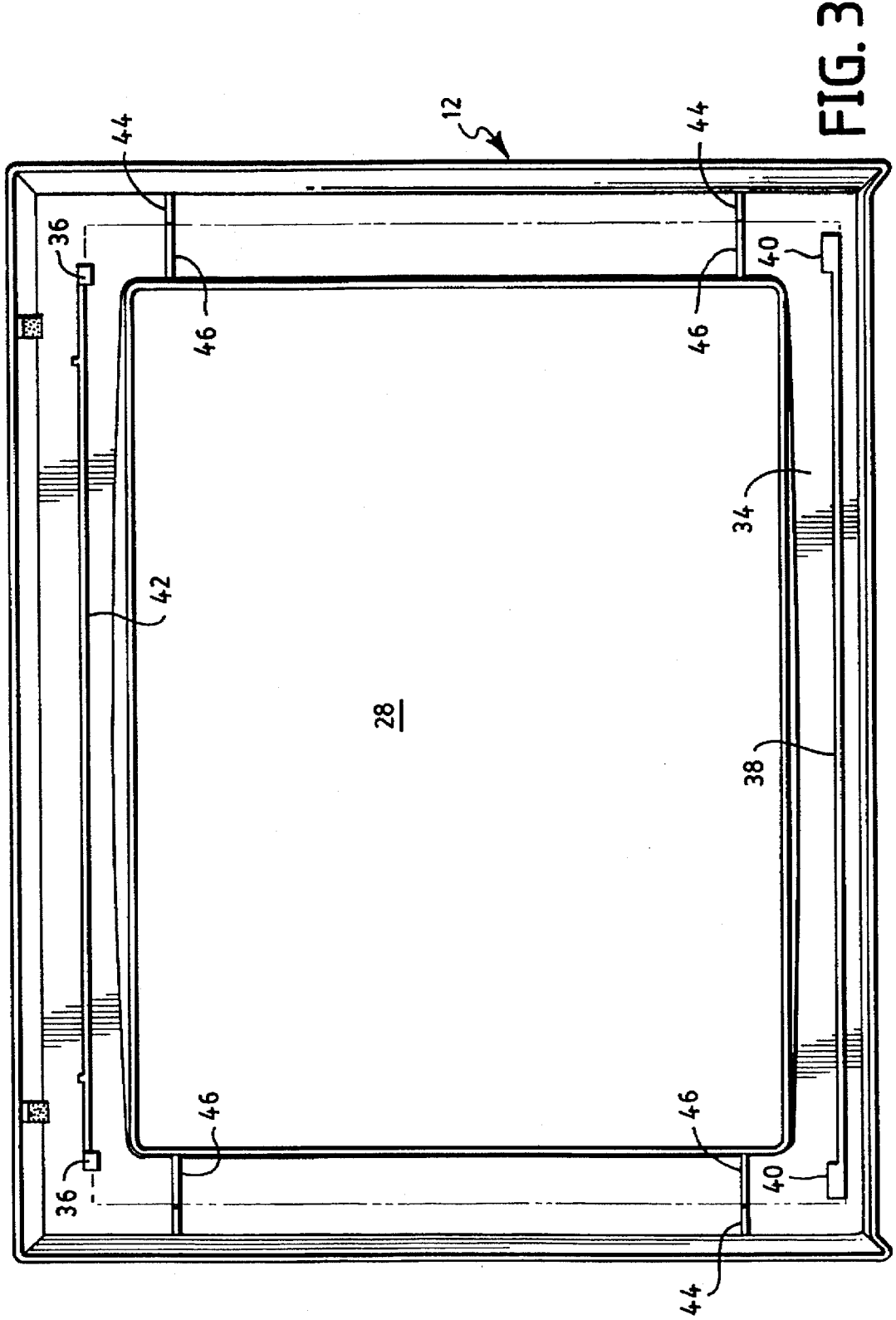
FIG. 3 is rear elevational view of the mounting frame.

With continued reference to FIG. 3, the rearward side 34 includes a plurality of upstanding centering ribs 44. The ribs 44 are integrally formed with the frame assembly. The ribs 44 are arranged to extend generally outwardly about the aperture 28 to the side walls as shown. The ribs 44 can have a top surface 46 which tapers toward the aperture. These ribs serve to efficiently center and guide the optical filter panel 14 so as to be in registry with the aperture 28 when the panel is placed on the frame assembly by the user. In addition, the ribs 44 contact the optical filter panel so as to space it from the frame assembly.

It will be noted that for securing the optical filter assembly 10 to the monitor, there is provided a plurality of hook and loop fastener devices 50 for assisting in the releasable mounting of the filter assembly 10 on the monitor. In this connection, a pair of such fastener devices 50 can be provided on the inboard surface of the top wall. Specifically, each of the fastener devices 50 include one element 52 the hook and loop fastener attached to a strip which is adhesively mounted to the wall 30. The other element 54 of the hook and loop fastener has a surface which is covered with a self-adhesive having a peelable strip (not shown) covering over it. When it is desired to mount the optical filter assembly to the monitor, the user peels the peelable strip covering the self-adhesive so that the pressure sensitive adhesive surface can be affixed to the top of the monitor. Then the hook and loop fastener is cut so that the element 54 remains adhesively attached to the monitor, while the other element 52 is affixed to the mounting frame. In this manner, there is provided a releasable mounting mechanism for the mounting assembly. The present invention of course contemplates the use of other releasable connection means between the mounting frame and the monitor.

Although one specific embodiment of an optical filter assembly has been shown and described above it will be appreciated that other variations of the present invention will be come apparent to those skilled in the art. The scope of the invention is therefor not limited to the specific forms shown and described but rather is indicated by the claims below.

What is claimed is:

1. An optical filter assembly for use on a visual display device comprising: a frame assembly defining a viewing aperture; said frame assembly being mountable on a visual display device such that said aperture is in registry with a visual display screen of the visual display device; an optical filter for coveting said aperture, and thereby the visual display area; said frame assembly includes a plurality of sidewalls which extend a distance sufficient for reducing the passage of room light to behind the optical filter; means on said frame assembly for releasably holding the optical filter to said frame assembly; and, means associated with said frame assembly for spacing the optical filter from the display screen; said spacing means includes protrusion means integral with said frame assembly for contacting the display screen for physically spacing the mounted optical filter from the display screen; and, means on said frame assembly for centering the optical filter when the latter is being mounted to said frame assembly; wherein said means for centering said filter includes a plurality of ribs which act to engage and guide the optical filter into registry with said aperture.

2. The apparatus of claim 1 wherein said frame assembly includes hook and loop fasteners for holding said frame assembly to the visual display device.

3. The apparatus of claim 1 wherein said filter holding means includes a receiving member for supporting a bottom edge of said filter.

4. The apparatus of claim 1 wherein said ribs engage said optical filter so as to space it from said frame assembly.

* * * * *